United States Patent [19]
Dorfel

[11] 3,786,705
[45] Jan. 22, 1974

[54] APPARATUS FOR SLITTING MOVING WEBS

[75] Inventor: Gerhard Walter Dorfel, Weilheim-Teck, Germany

[73] Assignee: A. Osakeyhtio Ahlstrom, Noormarkuu, Finland

[22] Filed: Aug. 31, 1971

[21] Appl. No.: 176,542

[30] Foreign Application Priority Data
Aug. 31, 1970 Finland .................................. 2405

[52] U.S. Cl. .......................... 83/71, 83/428, 83/504, 83/522
[51] Int. Cl. ............................................ B23d 19/06
[58] Field of Search ............. 83/428, 479, 499–504, 83/71, 522

[56] References Cited
UNITED STATES PATENTS

| | | | |
|---|---|---|---|
| 3,587,374 | 6/1971 | Stewart et al. .................... | 83/499 X |
| 1,070,640 | 8/1913 | Tucker ............................... | 83/499 X |
| 3,257,882 | 6/1966 | Lulie et al. ........................ | 83/499 X |
| 3,540,340 | 11/1970 | Koskela ............................ | 83/499 X |
| 3,583,270 | 6/1971 | Webb ................................. | 83/428 X |
| 3,176,566 | 4/1965 | Patterson, Jr. ................... | 83/498 X |
| 3,651,723 | 12/1969 | Gallagher .......................... | 83/499 X |

*Primary Examiner*—J. M. Meister

[57] ABSTRACT

Each one of the blades forming a web slitting blade pair and positioned at opposite sides of the web adjacent each other is provided with separate moving means. The separate moving means for a blade pair are connected to each other outside the web so that the blades may be moved together the web being between them and regardless whether the blades are in contact with each other in a cutting position or separated from each other in an inactive position. The blade moving means for the blades of a pair may comprise two threaded spindles extending along rail or the like on which blade supporting carriages are movable driven by said spindles. Further may a registering device be connected to the blade moving means to register the positions of all the blades and to transmit the information to a computer controlling the slitting operation.

4 Claims, 7 Drawing Figures

3,786,705

APPARATUS FOR SLITTING MOVING WEBS

BACKGROUND OF THE INVENTION

1. Field of the Invention

This application refers to an apparatus for slitting moving webs, for example paper webs, or the like, into two or more webs of smaller width. It specifically relates to an apparatus of the type having blade pairs for cutting the web longitudinally into two or more narrower webs, wherein the blade pairs are movable in the transversal direction of the web along guide means, such as rails.

2. Description of the Prior Art

In machines such as this the slitting is usually achieved with the help of pair of rotating cutting blades, and the width of the webs to be obtained can be varied by moving the blades in the transversal direction of the webs. Since in the slitting machines used so far it has been necessary to stop the machines for the adjustment of the blades, productional losses have incurred. Methods have been invented for shortening the time needed for the adjustment of the blades, for example the method in which the transversal movement of the blades, which is obtained with the help of power mechanisms, is determined by special limiting devices, which can be adjusted while the machine is in operation. The power mechanisms affect only one of the blades of the pair, and it is mentioned in the description that the pair can be coupled so that the blades move together, for example as has been explained in British Pat. No. 668,233. It is shown in the said patent specification that the coupling of the blades for moving them is carried out with the help of a pin in the holder of the upper blade; the pin is pressed into the hole in the socket of the lower blade. This means that the blades can be moved together only when the web is not moving between them.

The purpose of the present invention is to create an improved device for slitting a moving web in which the cutting blades can be adjusted quickly. Another purpose is to guide the blade adjustments by computer.

SUMMARY OF THE INVENTION

According to this invention there is provided a web slitting apparatus of the character described, comprising separate moving means for each one of the blades positioned adjacent each other on opposite sides of the web and forming a blade pair, which moving means are connected to each other outside the web in such a way that the blades may be moved in pairs as desired with the web between them regardless whether the blades of the blade pair are in contact with each other in a cutting position or separated from each other in an inactive position.

Thus, in a slitting apparatus according to the invention each blade of the pair has its own moving device and the blades of a pair can be moved together the web being between them. When the apparatus is in operation, the blades in the inactive position between two pairs of blades in the cutting position can be moved within the limits allowed by the blades in the cutting position, but also the positions of the blades in the process of cutting can be adjusted.

The apparatus may also comprise a registering device connected to the blade moving means to register the positions of all the blades. The slitting operation can thereby be controlled by a computer which receives information transmitted by the register device.

DESCRIPTION OF THE PREFERRED EMBODIMENTS

Figure 1:
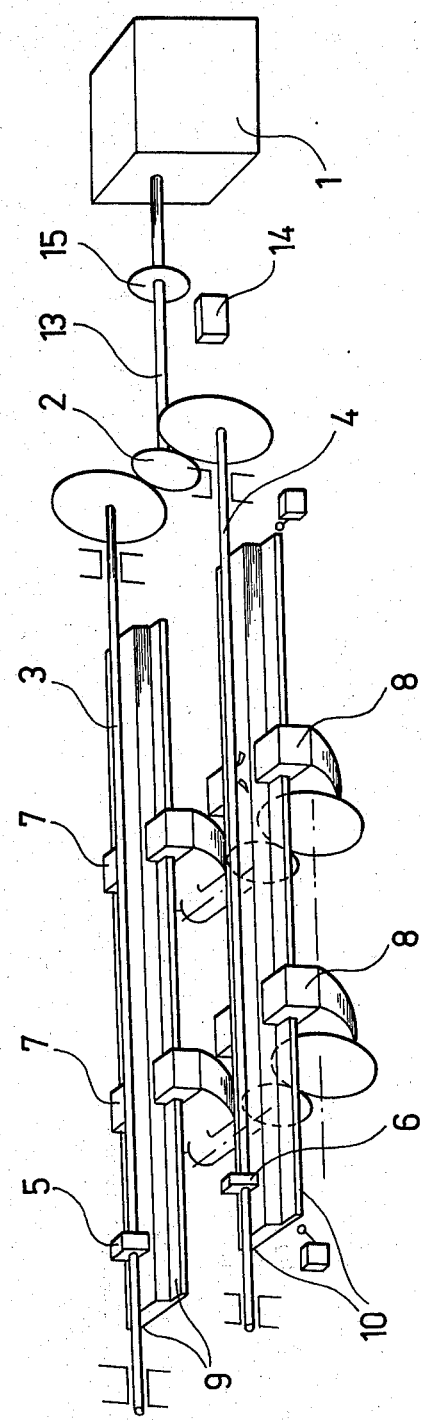
FIG. 1 shows a perspective view of a slitting apparatus according to the invention.

In FIG. 1, the reference numeral 1 indicates the driving motor of a blade adjustment device, which operates threaded spindles 3 and 4 via gearing 2. When the threaded spindles 3 and 4 rotate, runners 5 and 6 move in the longitudinal direction of the spindles. The blades with their hubs are attached to carriages 7 and 8, which move along rails 9 and 10 respectively one blade attached to a carriage 7 and one blade attached to a carriage 8 to form a pair. The driving motors of the blades have been left out of the illustration for the sake of clarity. Each blade pair may be positioned such that the blades are in contact in the cutting position or out of contact in the inactive position.

Figure 2:
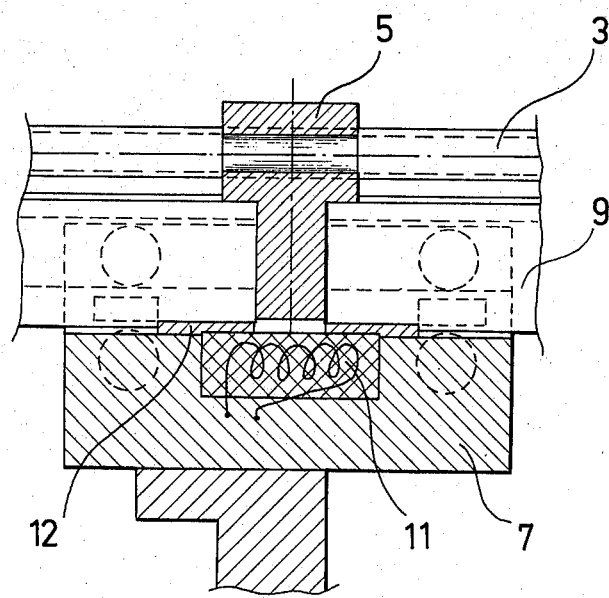
FIG. 2 is a longitudinal view of a portion of one embodiment of the apparatus, in cross section.
Figure 3:
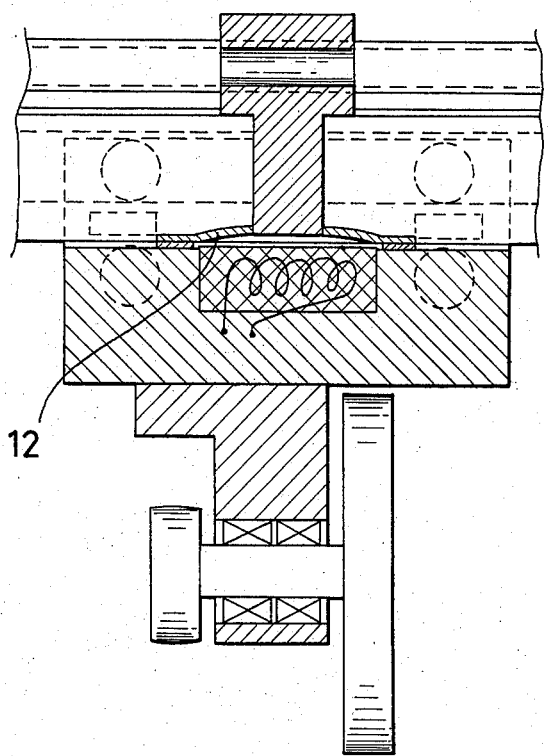
FIG. 3 is another longitudinal view of the same portion in cross section.
Figure 4:
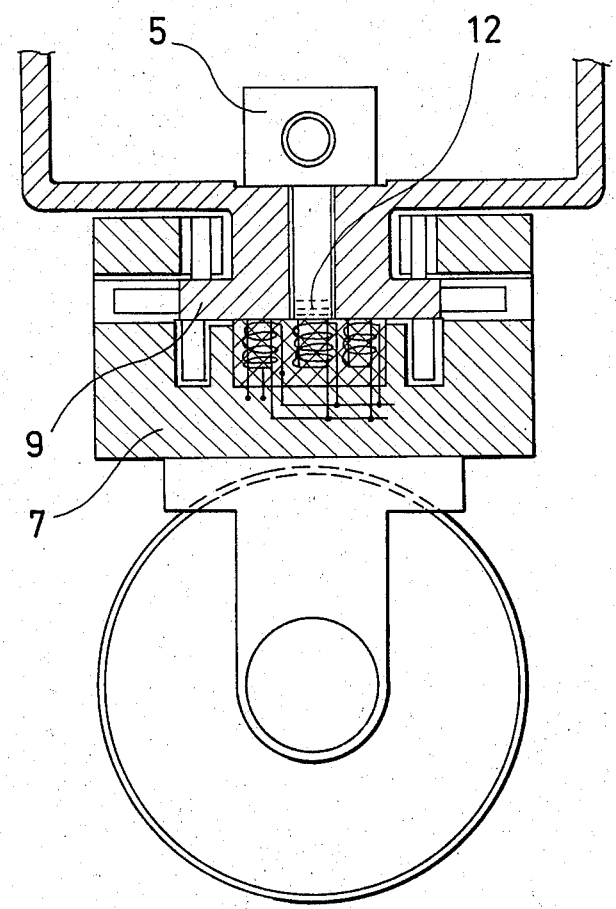
FIG. 4 is a cross section of the embodiment of FIGS. 2 and 3.

FIG. 2 shows an electromagnet 11 housed in a blade carriage. When provided with current, the electromagnet 11 deforms a spring plate 12 into such a shape that the runner 5 may pass by (as shown in this figure), and when it is without current, the underformed spring plate takes the shape shown in FIG. 3, in which case an extension of the runner projects into a hole in the spring plate and moves the carriage to which the plate is attached, along. FIG. 4 shows a cross section of the arrangement shown in FIGS. 2 and 3.

When the magnet is provided with current, there is a magnetic pull between blade carriage 7 and rail 9 so that the blade is immobilized.

Figure 5:
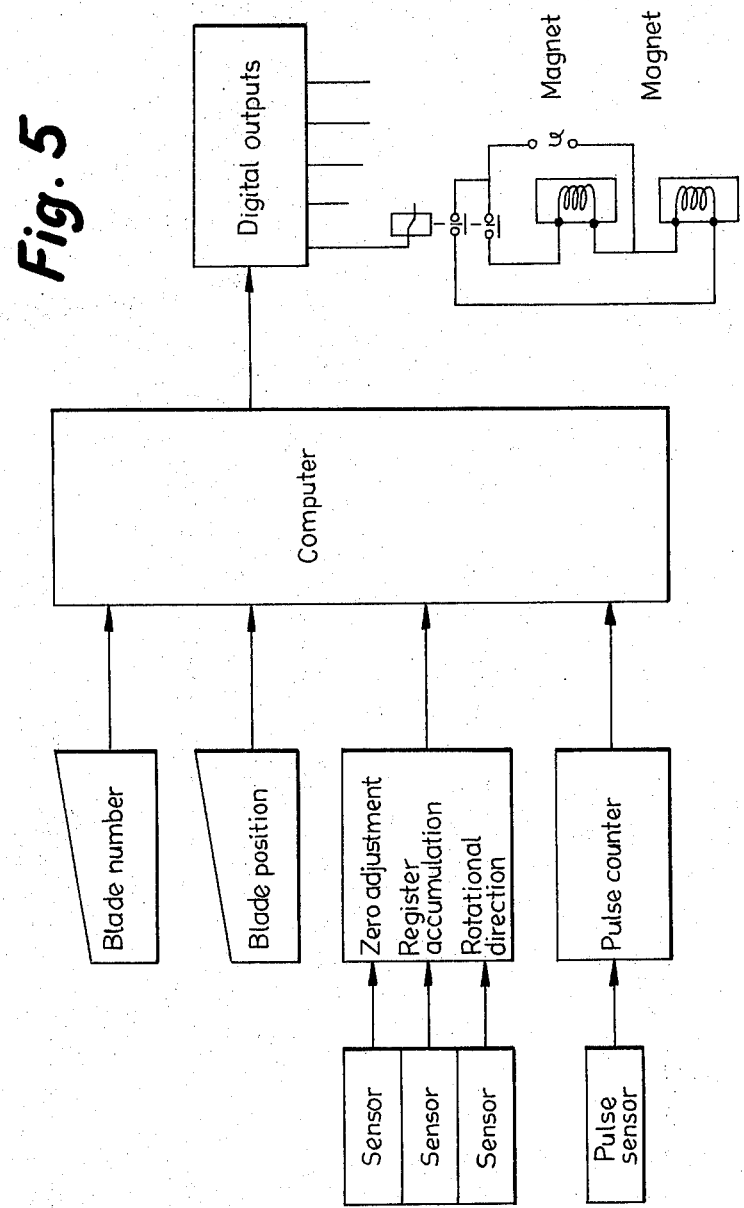
FIG. 5 shows computer logic applicable for the control of the apparatus.

The adjustment of the blades by computer takes place in the following manner; referring to FIG. 5.

The position of each blade is determined by the threaded spindle associated with it. The rotational motion of the spindle is measured by a pulse sensor placed on the driving gear 13 and a pulse counter 14. A predetermined number of pulses corresponds to a certain linear movement of the blade. The new adjustment values of the blades i.e., the blade number (each blade being identified by a number) and the new position, are fed into the computer, which converts the new position given in linear measure into the corresponding number of pulses. When the computer is in operation to obtain the new position when the number of pulses received from the pulse sensor is equal to the desired movement, the computer issues an order which frees the blades from the spindle and simultaneously locks them to the rail by the electromagnet. The adjustment of the blades always begins from a zero reference so that, depending on the previous blade adjustment, runners 5 and 6 are driven to a position at which time the pulse counting register of the computer is zeroed and then the pulses received from the pulse sensors are accumulated to the register, or alternatively subtracted, depending on the rotational direction of the threaded spindles given by the sensor 15. For practical reasons, the blades which have to be moved in one direction are shifted first, and then the blades to be moved in the other direction are shifted. The blades may be moved while they are in the cutting or the waiting position.

Figure 6:
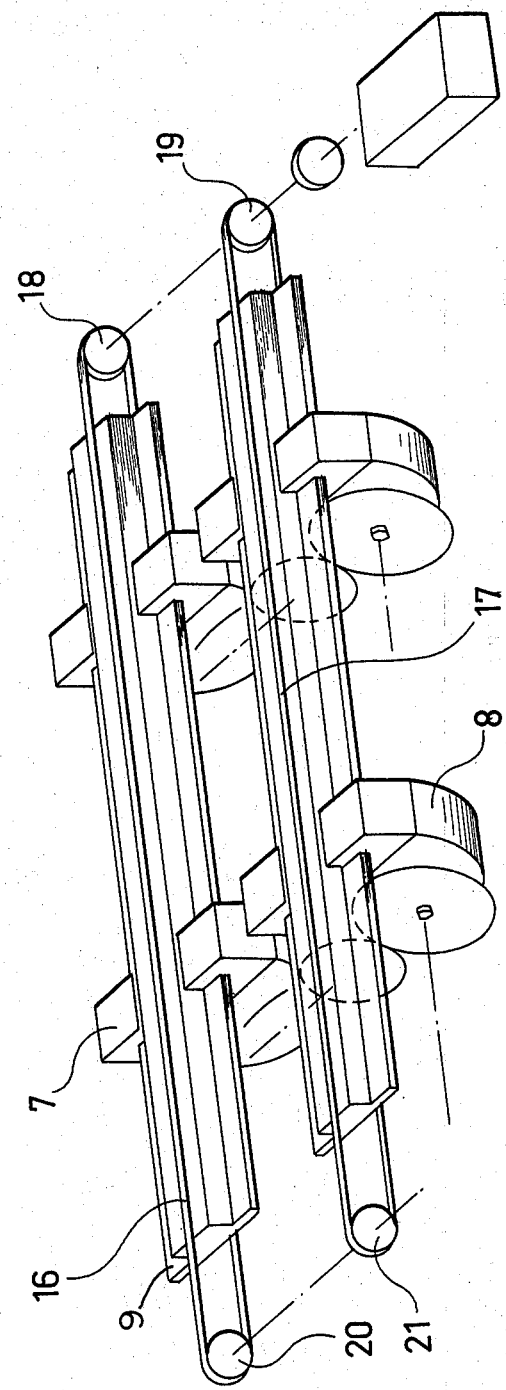
FIG. 6 shows another apparatus according to the invention.

FIG. 6 shows another application of the invention, in which the blades are moved by endless belts 16, 17, which can be of an even surface or have cogs to mate with the driving and turning gears 18, 19, 20 and 21.

Figure 7:
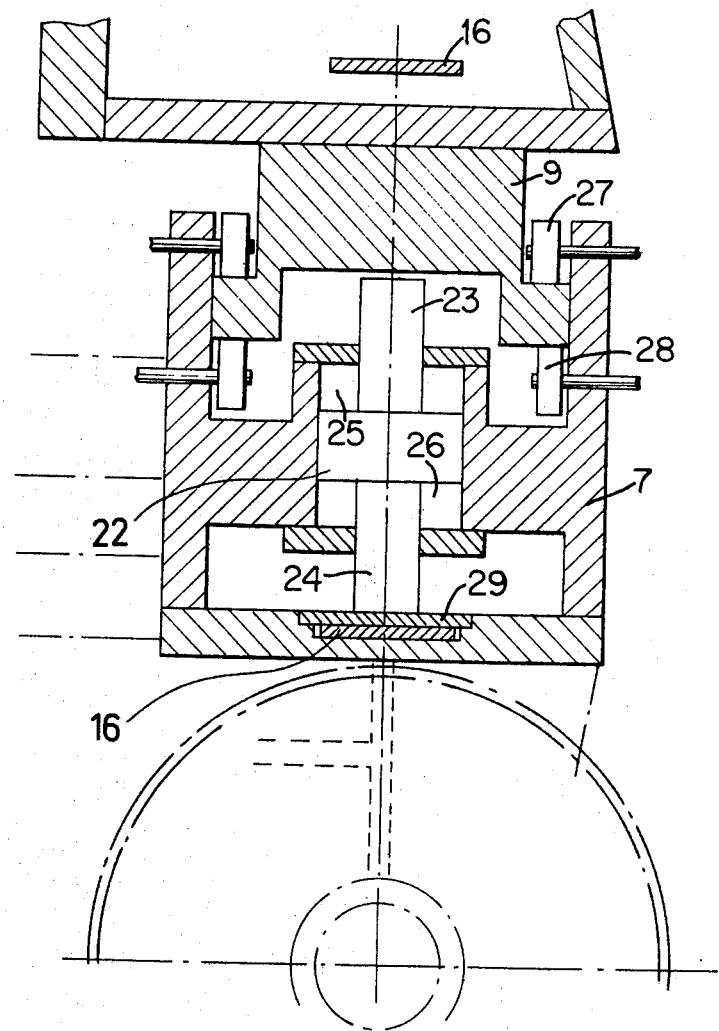
FIG. 7 shows a detail of the application according to FIG. 6.

FIG. 7 shows a mechanism for use in a slide 7 or 8, with which mechanism the blade carriage can be locked either to a moving belt or to a stationary rail. The locking is produced by applying air pressure to one side of piston 22 an extension thereof locking the belt between itself and the carriage or locking the rail. Numeral 7 indicates the blade carriage on a rail 9. The piston 22 has shafts 23 and 24 on each side, respectively. The piston is provided in a housing 7 in such way that a pressure medium chamber 25 and 26 is formed on each side thereof. The blade carriage 7 moves along the rail 9 guided by wheels 27 and 28 on both sides of the flange of the rail. When pressure is provided in the chamber 26 below the piston, while the opposite chamber 25 is not under pressure, the piston shaft 23 is forced against the rail 9 thereby locking the blade carriage to the rail. When the pressure is brought to act in the chamber 25 at the upper side of the piston, while chamber 26 is not under pressure, the piston shaft 24 forces the belt 16 against the carriage 7, locking the carriage to the belt for positioning of the blade. Between the end of the piston shaft and the belt is provided a metal plate 29 preventing the end of the shaft from penetrating the belt.

I claim:

1. An apparatus for slitting moving webs of material and of the type having blade pairs for cutting the web longitudinally into at least two narrower webs, which comprises blade pairs movable in the transversal direction of the web along guide means, separate moving means for each one of the blades positioned adjacent to each other on opposite sides of the web and forming a blade pair, said moving means comprising a pair of separate endless belts which are connected to each other outside the web, the blades being movable in pairs with the web between them when the blades of the blade pair are in contact with each other in a cutting position and when the blades of the blade pair are separated from each other in an inactive position, carrying means for moving the blades with said belts and a double-acting locking device for locking the carrying means to said belts and to said guide means.

2. An apparatus according to claim 1, further comprising a registering device connected to the moving means for the blades to register the positions of all the blades and to transmit the information for computer control of the slitting apparatus.

3. An apparatus according to claim 1, whrein the guide means are rails and said endless belts extend over the length of the rails and are driven together by driving devices fitted outside the web.

4. An apparatus according to claim 3, wherein the double-acting locking device for locking the belts to the carrying means comprises a double-acting pressure medium driven piston which locks the carrying means to the belt for moving when it is pressed in one direction, and locks the carrying means to the rail after the moving when it is pressed in the other direction.

* * * * *